US012243182B1

(12) United States Patent
Carrier et al.

(10) Patent No.: US 12,243,182 B1
(45) Date of Patent: Mar. 4, 2025

(54) METHOD AND SYSTEM FOR CREATING PROGRAMMABLE, LICENSABLE, AND CUSTOMIZABLE DIGITAL ARTWORKS AND ASSETS WITH INTERCONNECTED CUSTOM MANUFACTURED PHYSICAL OBJECTS

(71) Applicants: Thomas C. Carrier, Lancaster, PA (US); Oren Sherman, Truro, MA (US)

(72) Inventors: Thomas C. Carrier, Lancaster, PA (US); Oren Sherman, Truro, MA (US)

( * ) Notice: Subject to any disclaimer, the term of this patent is extended or adjusted under 35 U.S.C. 154(b) by 236 days.

(21) Appl. No.: 18/154,171

(22) Filed: Jan. 13, 2023

Related U.S. Application Data

(60) Provisional application No. 63/299,472, filed on Jan. 14, 2022.

(51) Int. Cl.
*G06T 19/20* (2011.01)
*G06T 19/00* (2011.01)

(52) U.S. Cl.
CPC ............ *G06T 19/20* (2013.01); *G06T 19/003* (2013.01); *G06T 19/006* (2013.01)

(58) Field of Classification Search
CPC ...... G06T 19/20; G06T 19/003; G06T 19/006
See application file for complete search history.

(56) References Cited

U.S. PATENT DOCUMENTS

| 9,159,106 B1* | 10/2015 | Bodell | G06Q 30/0643 |
|---|---|---|---|
| 10,112,114 B2 | 10/2018 | Borge | |
| 10,238,958 B2 | 3/2019 | Inagaki | |
| 10,902,509 B1 | 1/2021 | Pescce et al. | |
| 10,970,843 B1 | 4/2021 | Olsen et al. | |
| 11,004,260 B2 | 5/2021 | Pillai | |
| 11,113,754 B2 | 9/2021 | Andon et al. | |
| 11,335,064 B1* | 5/2022 | Barranco | G06T 17/20 |
| 2015/0170260 A1 | 6/2015 | Lees et al. | |
| 2015/0220291 A1* | 8/2015 | Tapley | G06F 3/1222 |
| | | | 358/1.15 |
| 2018/0262713 A1* | 9/2018 | Huang | G06T 15/20 |
| 2019/0102815 A1* | 4/2019 | Norman | G06Q 30/06 |

(Continued)

FOREIGN PATENT DOCUMENTS

KR      20210129381 A      10/2021

*Primary Examiner* — Maurice L. McDowell, Jr.

(57) ABSTRACT

Systems and methods are detailed for generating customizable and licensable digital assets and artworks for unique physical object creation, branded merchandising, and digital experiences. A digital model and corresponding digital environment are controlled mathematically and parametrically to produce digital assets that are production ready for manufacturing both in three-dimensional and two-dimensional processes. Viewpoints and video loops of the digital model in its digital environment are used for fly-through image capture while, at the same time, variable-controlled geometric transformations and colorways are applied to the digital model and environment to create endless compositions that are copyrighted and licensable artworks. The image capture, or keyframes, are combined to create videos and animations of the digital model and its environment. Yielding from this interdependence and interconnectivity of physical objects and their digital counterparts are the designs and production files that are delivered to the owner(s) for manufacturing.

19 Claims, 12 Drawing Sheets

(56) References Cited

U.S. PATENT DOCUMENTS

| | | |
|---|---|---|
| 2020/0351608 A1 | 11/2020 | Padgett et al. |
| 2021/0150587 A1 | 5/2021 | Rizvi et al. |
| 2021/0201336 A1 | 7/2021 | Mallett et al. |
| 2021/0279695 A1 | 9/2021 | Rice |

* cited by examiner

Tablet Display

Mobile Display

Monitor Display

500

Tablet Display

Mobile Display

Monitor Display

US 12,243,182 B1

METHOD AND SYSTEM FOR CREATING PROGRAMMABLE, LICENSABLE, AND CUSTOMIZABLE DIGITAL ARTWORKS AND ASSETS WITH INTERCONNECTED CUSTOM MANUFACTURED PHYSICAL OBJECTS

CROSS-REFERENCE TO RELATED APPLICATIONS

This utility patent application claims priority from U.S. provisional patent application Ser. No. 63/299,472, filed Jan. 14, 2022, titled "Method and System for Creating Programmable, Licensable, and Customizable Digital Artworks and Assets with Interconnected Custom Manufactured Physical Objects", naming inventors Thomas C. Carrier and Oren Sherman.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Field of Technology

This relates to systems and methods for generating digital assets for physical object creation and digital experiences.

Background

Digital modeling platforms, digital models, digital assets, and manufactured physical objects have existed for generations with virtual experiences and connectivity becoming a fairly new application. Examples include, mobile devices used to visualize a physical object in a three-dimensional environment, interactive physical objects used to access digital content in gaming environments, tradable physical and digital collectibles, a digital data service platform for a 3D model, locating digital objects in a virtual environment, physical products that provide virtual products to customers, a plurality of digital and interactive videos, 3D models and images used to visualize options of a physical product, digital delivery of analytics of physical objects, managing branded digital items and non-fungible tokens, distribution of cryptographic digital assets, and methods for physical item acquisition. There are several patents that discuss such digital assets, their digital modeling platforms and manufactured physical objects.

U.S. Patents

U.S. Pat. No. 10,112,114 ("Interactive Action Figures for Gaming Systems", Borge, Oct. 30, 2018) discloses, in the Abstract, "An action figure is provided with a serial number that provides an access code which allows owners to engage in enjoyable games or other activities via the Internet or other gaming systems. The interactive action figure system comprises a toy, statue, or other three-dimensional figurine with a serial number, and preferably a computer network accessible over the internet and a particular gaming framework managed by a network device. Owners of action figure toys may 'log onto' the network using the action figure serial number as an access code to activate a particular computer character identity and participate in games such as hand-to-hand combat games, action-adventure series, or learning games. The action figure may be, for example, a warrior, sports figure, doll or teddy bear to appeal to a wide range of users. Once a particular character is activated, game play proceeds according to preset rules. The game character's traits, powers, and other features may be enhanced or otherwise modified by purchasing preferably-three-dimensional accessories and inputting serial numbers into the gaming system that are also supplied with the accessories."

U.S. Pat. No. 10,238,958 ("Tangible collectibles having a digital copy", Inagaki, Mar. 26, 2019) discloses, in the Abstract, "Tradable physical collectible objects are described. In particular, systems and methods for using the tradable physical collectible objects facilitate generation of a digital copy that can be used within a network game. A user can use the digital copy and perform various modifications to the digital copy. A value can be determined for the digital copy based on the various modifications. At a later date, the user (e.g., owner) is free to give away, sell or trade the digital copy to another party in transaction with terms based on, for example, the determined value of the digital copy." This describes a tangible and tradeable collectible within a video game. The collectible includes an identifier such as a VIN or a barcode used to import a digital version of the collectible object. The user can interact with said object in-game, such as playing with or customizing of said object. A rights management system manages the trading or sale of the digital object.

U.S. Pat. No. 10,902,509 ("Providing digital representations based on physical items", Pesce et al., Jan. 26, 2021) discloses, in the Abstract, "Methods and apparatus for collecting information for physical products by providing virtual products to customers. Virtual products (digital representations of physical products) may be provided to customers that provide item information including but not limited to evidence of ownership of corresponding physical products, for example photographs or sales receipts. The customers may use the virtual products in various applications in which the customers may establish a virtual presence. The information provided by the customers may be collected, analyzed, and applied in one or more areas of real-world production and marketing, for example in obtaining competitive pricing information. Digital lockers may be provided for the customers to which the virtual products are stored; the applications may access the virtual products for a customer from a respective digital locker."

U.S. Pat. No. 10,960,843 ("Generating Interactive Content Using a Media Universe Database", Olsen et al., Apr. 6, 2021) discloses, in the Abstract, "A media universe database is configured to store a plurality of elements of media universe content related to a media universe. An analysis of a digital video is performed. Based at least in part on the analysis, a correspondence is determined between one or more objects in the digital video and respective elements of the media universe content. An interactive digital video is generated based on the digital video. The interactive digital video comprises a plurality of video frames. The one or more interactive video frames comprise one or more interactive objects corresponding to the elements of media universe content."

U.S. Pat. No. 11,004,260 ("Item Model Based on Descriptor and Images", Pillai, May 11, 2021) discloses, in the Abstract, "A model generation machine may form all or part of a network-based system. The model generation machine may generate an item model (e.g., a 3D model of the item)

based on a set of images of an item and based on a product model (e.g., a 3D model of a product which the item is a specimen). The item may be available for purchase from a seller. The model generation machine may access the set of images, as well as a descriptor of the item. Based on the descriptor, the model generation machine may identify the product model. Accordingly, the model generation machine may generate the item model from the identified product model and the accesses set of images."

U.S. Pat. No. 11,113,754 ("Event-based distribution of cryptographically secured digital assets", Andon et al., Sep. 7, 2021) discloses, in the Abstract, "A method of event-based distribution of a cryptographic digital asset includes receiving, from a computing device associated with a user, an indication that the computing device is located at a predetermined venue within a predetermined window of time; receiving a unique owner identification (ID) code associated with the user; receiving a unique code acquired by the user; determining a unique digital asset ID code corresponding to the received unique code, the unique digital asset ID code being representative of the cryptographic digital asset; and transmitting a cryptographic block to a distributed blockchain ledger to record transfer of the cryptographic digital asset to the user, the cryptographic block comprising both the unique digital asset ID code and the unique owner ID code." This explains a product which can be tracked in a blockchain, customized, utilized in other digital environments (including games), tracked for branding research, and bred (to create differently customized offspring shoes).

U.S. Patent Application Publications

United States Patent Application Publication 2015/0170260 ("Methods and systems for using a mobile device to visualize a three-dimensional physical object placed within a three-dimensional environment", Lees et al., Jun. 18, 2015) discloses, in the Abstract, "Systems, methods and computer program products for using a mobile device to visualize physical objects in an environment are described herein. An embodiment includes receiving a three-dimensional model of an environment, detecting, using a sensor on the mobile device, an identifier identifying a physical object and retrieving, using the detected identifier, a three-dimensional model of the physical object. An embodiment further includes displaying. On the mobile device, the three-dimensional model of the physical object within the three-dimensional model of the environment and, in response to user gestures on the mobile device, displaying the physical object at different places within the environment."

United States Patent Application Publication 2020/0351608 ("Locating content in an environment", Padgett et al., Nov. 5, 2020, discloses, in the Abstract, "A method includes determining a device location of an electronic device, and obtaining a content item to be output for display by the electronic device based on the device location, wherein the content item comprises coarse content location information and fine content location information. The method also includes determining an anchor in a physical environment based on the content item, determining a content position and a content orientation for the content item relative to the anchor based on the fine content location information, and displaying a representation of the content using the electronic device using the content position and the content orientation." This patent application describes a physical object carrying a code which can be scanned by a user's mobile device. By scanning the code, the user can interact with a virtual object in a VR environment.

United States Patent Application Publication 2021/0150587 ("Engagement analytics on mixed digital/physical platforms", Rizvi et al., May 20, 2021) discloses, in the Abstract, "Embodiments described herein relate generally to data analytics and asset distribution technologies on physical objects. In particular, physical marketing collateral may integrate wireless and/or wired communication, cloud-based portal, and data analytics to provide a mixed digital/physical information exchange platform. Digital assets may be hosted on a cloud. Physical objects may be configured to display these assets on an internet-enabled device. The physical objects may be distributed among a plurality of end-users who may engage with the assets. Engagement with the digital assets may be monitored, aggregated and subjected to a variety of calculations to evaluate various analytics which quantify performance of the digital assets. At any time, the digital assets may be changed on the cloud, remotely updating the digital assets accessed via the associated physical objects. The 'look and feel' of both the physical objects and the cloud-based portal may be customized to meet branding standards and requirements."

United States Patent Application Publication US2021/0201336 ("Apparatus and method for managing branded digital items", Mallet et al., Jun. 1, 2021) discloses, in the Abstract, "A system and method for managing branded digital items is provided. One embodiment generates a branded digital item in response to an agreement between a brand client and a content provider to use a branded product in a digital environment of the content provider, wherein the branded digital item is a recognizable graphical object; generates a branded digital item blockchain that includes a non-fungible token associated with the branded digital item; receives information corresponding to a purchase of the branded digital item by a user; and updates the non-fungible token to memorialize purchase of the branded digital item by the authorized user, wherein the updated non fungible token is returned to a ledger of the branded digital item blockchain."

United States Patent Application Publication US2021/0279695 ("Systems and methods for item acquisition by selection of a virtual object placed in a digital environment", Rice, Sep. 9, 2021) discloses, in the Abstract, "Systems and methods for item acquisition by selection of a virtual object placed in digital environment are disclosed. A processor(s) and memory may be configured to receive a coordinate for placement of a virtual object in a digital environment; control the display to display the virtual object when a position corresponding to the received coordinate is within a field of view of the image capture device; receive an input via the user interface for selecting the virtual object; and associate with a user a credit for acquisition of an item associated with the virtual object in response to receipt of the input. Rights created in a virtual goods object are made equal to rights existing in or created in a real-world asset. Ownership of the virtual goods object conveys ownership or other property rights in the real-world asset." This describes a virtual object which is linked to a physical product and can be redeemed for said physical product. The virtual object could be 2D or 3D and can be interacted with in an augmented reality environment, with options to implement a social aspect in the AR environment. The virtual object can be linked to a non-fungible token to control the rights and transfer of said object.

Foreign Patent Documents

Korean Patent Application Publication KR10-2021-0129381 ("3d system for providing 3d model design data platform service and method thereof", Song, Apr. 20, 2020)

discloses, in the Abstract, "A system and method for providing a 3D model design data platform service are provided. The system includes collecting one or more 3 D model design data for fabricating a 3D model including a space model and a model, evaluating data quality of the collected 3 D model design data, an operation server dividing the 3D model design data into public data and sales data according to the evaluated data quality, and providing an integrated platform service including collection, analysis, sharing, and transaction of the 3D model design data; and a user terminal connecting to the operating server to request a 3D model service including searching, sharing, and transaction for the 3D model design data, and using the 3D model service according to a service request processing result of the operating server. The operating server applies a Digital Rights Management (DRM) description to the sales data and then performs an authentication confirmation operation according to a request of the user terminal."

None of the above provides the ability to produce countless, unique digital artworks and assets related to (1) the customizable physical object and its digital model counterpart, (2) the customized digital model in its digital environment, (3) the customization and image capture of the composition of the digital model, physical model, and digital environment, (4) the countless licensable and customizable digital assets in the form of videography and still imagery, and (5) the production, manufacturing, merchandising, licensing, and distribution of the digital assets for physical object production. What is needed, therefore, is a method and system to generate the above-mentioned digital models and the interconnected digital assets that overcomes the above-mentioned limitations and that includes the features enumerated above.

BRIEF SUMMARY

This relates generally to systems and methods with both processes and data systems designed to generate countless digital assets in the form of licensable videos, still images, and digital/physical objects. The digital assets are derived from the interdependency of 3D objects and digital counterparts, yielding custom manufactured physical objects for licensing and merchandising.

A customizable and parametrically controlled digital object is attributed with a unique geometric organization within a customizable and parametrically controlled digital environment. A user may adjust the digital object, digital environment, viewpoints, and colorways to produce thousands of unique digital assets from the composition of the items noted above that are controlled by the user. All the adjustable items noted above are interconnected, but not dependent on one-another, allowing for endless variations of the items noted above and the delivery of endless digital assets to be created from the systems and methods detailed herein.

The digital assets created that are described above are countless high-resolution still images that are sequenced and inventoried, the images combined and overlaid to create videos, and the unique digital models validated for digital applications and physical manufacturing processes including, but not limited to, additive, subtractive, casting, molding, etc.

The digital products that yield from the digital assets created include, but are not limited to, digital models, digital displays, banners, wallpapers, texture maps, billboards, advertisements, projections, avatars, non-fungible tokens, etc. At the same time, 2D physical products that yield from the digital asset creation include, but are not limited to the following items for manufacture, stickers, postcards, framed artwork, surface design (e.g. wallcovering, carpet, textiles, surface wraps, and any other pattern and material interaction, etc.), wearable merchandise (e.g. hats, t-shirts, sweaters, including all apparel, etc.), etc. Finally, and at the same time, 3D physical products that yield from the digital asset creation include, but are not limited to the following items for manufacture, jewelry, sculpture, home goods, tools, toys, trinkets, etc.

All digital assets listed above are licensable and hyper-customizable artworks and digital assets; and the physical products listed above are all examples of being unique, branded, merchandisable, and licensable for the consumer market. Through the systems and methods developed for each unique digital model, environment, and composition, the artworks are not able to be recreated without the specific variables and parameters set forth by the user. This creates a truly unique set of hyper-customizable digital assets with their related digital and physical products for the end-user.

Features and Advantages

There are several features and advantages. A customizable digital model and digital environment are developed to generate digital assets and manufactured physical objects pertaining to each instance of a physical object and its digital counterparts.

A customizable and programmable digital design environment yields a unique digital model created in a virtual object generator that is parametrically controlled and has multi-variable functionality to provide the user with exclusive ownership of the unique designs created.

Countless iterations and organizations of digital environments and their corresponding objects are supported to generate licensable, customizable, and unique digital assets for a branded physical and digital asset experience.

The resulting videos from a digital model and digital environment may be custom colored and controlled by the parameters in the virtual object generator to create endless visual graphic organizations with the ability to sell/own the digital design and intrinsic data contained in the form of, but not limited to, thousands of unique videos and their corresponding licensable still images.

The unique digital model geometry is designed to be physically, custom manufactured, reproduced, bought, sold, or otherwise owned by the user as a singularity or in multiples with complete exclusivity to access and rights to manufacture, sell, and distribute.

The privacy, security, and exclusivity of each iteration of the physical and corresponding digital assets is protected.

Software is operated across a network such as within a cloud service platform, within an organization's internal network, or as a standalone workstation (a mobile worker or remote telecommuter). Countless iterations of licensable/customizable digital artworks and assets are generated, stored locally until a user requests the assets, and can be streamed as desired.

The digital artwork and assets can be further manipulated to develop specific physical product applications and/or interactive experiences with end-users and consumers.

Boundless vantage points, spatial relationships, geometric transformations, and colorways are provided to produce a highly scalable and customizable method to create branded content, licensable artworks, physical objects, and physical products/merchandise.

Multiple opportunities are created, such as, but not limited to, exclusive ownership of the digital and physical assets, licensing of those assets, and hyper-customization and production of unlimited amounts of unique products for an organizational or personal brand.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

Figure 1:
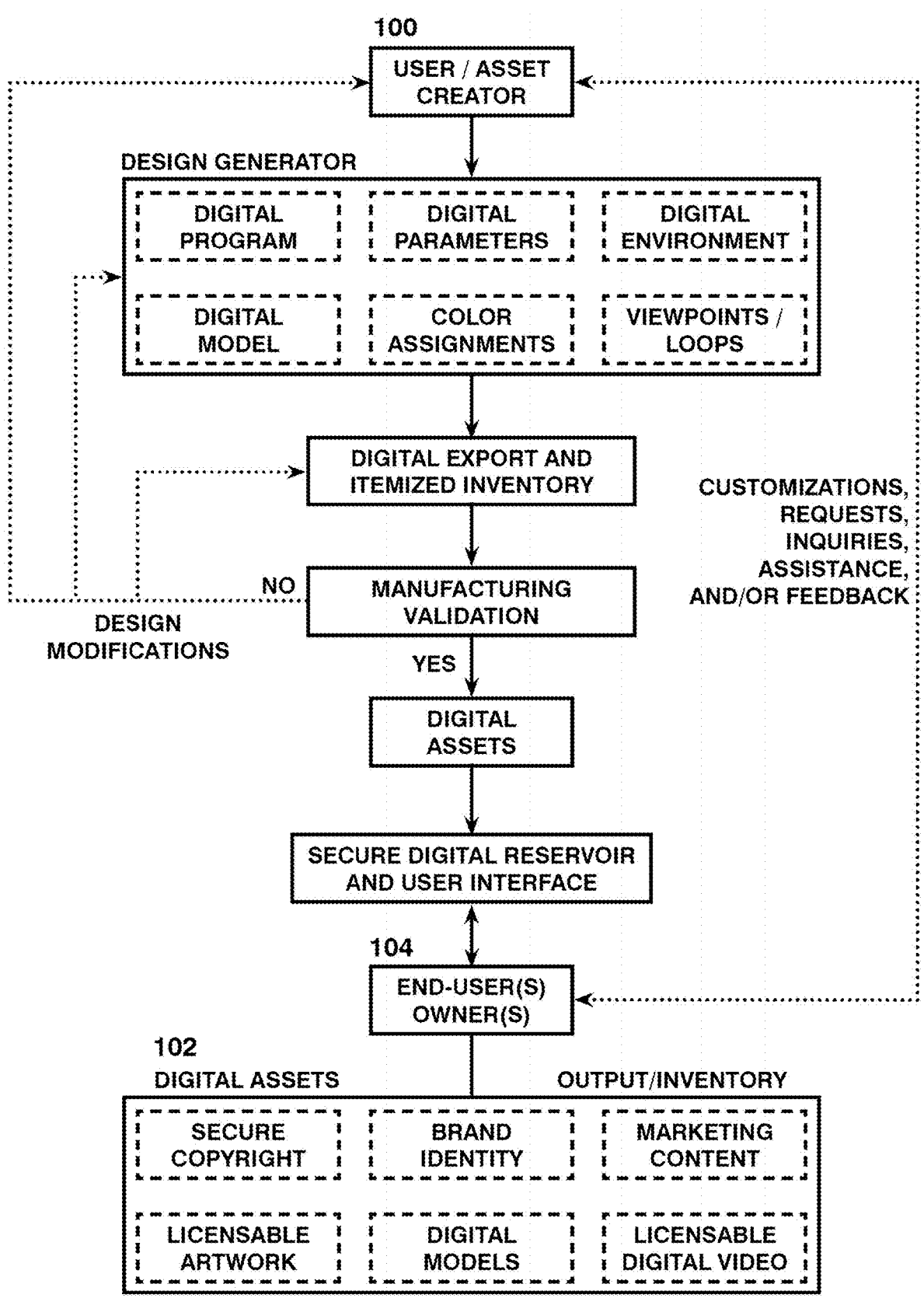
FIG. 1 is a block chart of the systems and methods for creating and ultimately transferring digital assets to the end user(s) and/or owner(s).

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current disclosure. Where there is a conflict, the following definitions apply.

HYPER-CUSTOMIZATION means customization that exists within a space of more than three-dimensions.

PARAMETRIC means a constant in an equation that varies in other equations of the same general form, especially such a constant that can be varied to make a unique output.

UNIQUE means being the only one of its kind.

CUSTOM means to be made or done to order for a specific and particular purpose or customer.

VIEWPOINTS is the position(s) from which something is observed.

KEYFRAMES are a drawing or shot that defines the starting and ending points of any smooth transition.

ASSETS are a useful or valuable thing or quality.

MERCHANDISE are goods to be produced, bought, and sold.

DIGITAL CONTENT is a digital model file, video, image, or text file.

DIGITAL EXPERIENCE POINT contains one or more digital content files or access paths or links to one or more digital content files, and has links to zero or more other digital experience points.

DIGITAL EXPERIENCE OBJECT contains a first digital experience point that has links to one or more further digital experience points, and all digital experience points reached by following links from the first digital experience point through linked further digital experience points.

Operation

Detailed herein are systems and methods to create a mathematical, parametric, and unique digital object that meets the requirements of custom manufacturing in a field such as additive, subtractive, casting, or other methodologies as well as digital models that can be utilized in digital experiences. The systems and methods use the digital object generator's digital environment to position viewpoints, create animation loops and paths, and/or other image capture methodology while coloring and composing to create the digital assets that can be processed into an unlimited number of still images. The still images are sequenced, used as keyframes to produce videos, combined with other videos, overlaid with synchronized audio tracks, and exported in a video and/or audio file format such as .mp4, .mov, .avi, .smf, or other. The digital models for manufacturing and digital experience, countless still images, and videos are uploaded to the internet into a secure reservoir for access only by the owner(s) via identification code such as UPS, RFID, QRCode, or other equivalents. The owner has exclusive access and rights to their unique digital assets for buying, selling, licensing, or other digital transactions. This enables their digital assets to be manufactured into physical products, merchandise, and other end uses.

A user or asset creator creates a digital model, preferably through 3D parametric modeling software either in its own package or within a programmable environment, for example, but not limited to, Rhinoceros+Grasshopper, Revit+Dynamo, Blender, Catia, 3DS Max, Python, C#, C++, and Java. The output as a result of the initial design is a 3D digital model, displayable within the modeling software, and one or more manufacturing files able for execution to produce a physical version of the 3D digital model, such as, but not limited to, through 3D printing or CNC machining. The 3D modeling software is then used to develop a digital environment and create a digital experience object. The digital experience object contains an initial digital experience point for a user to access or otherwise interact with the digital model within its digital environment, and enables access to other digital experience points. Each digital experience point may include an accessible piece of digital content, serve as access to further digital experience points, and be owner configurable for license and access rights. The digital experience object is preferably hosted in an Internet accessible location, such as storage within a cloud platform accessible through a web browser interface to a web server, but alternatively may be in any network reachable storage including within a private network if deployed non-publicly, and accessible through a web browser, web or platform-specific app, or dedicated software application. In a preferred embodiment, the initial digital experience point is an interactive 3D digital model and digital environment, a video of the 3D digital model and environment, and with thousands of digital still images stored within additional digital experience points accessible by interaction with the digital model, video, or still images. The digital files may be stored within a file structure or database on a server or within a cloud platform service. The physical version of the 3D digital model may be on display, such as at a museum or a home, and include displayed information, such as a QR code, that provides access to the digital experience object. Users may use personal computing devices, such as, but not limited to, computers, smartphones, and tablets, to access the digital experience object through the displayed information, such as by scanning the QR code. The video, or other initial digital experience point, may automatically play on the personal computing device within a standard browser interface, or customized application. Interaction with the digital experience object may trigger options to access related additional digital experience points associated with the point of interaction. For example, pausing or clicking on the video may present still images (in the additional digital experience points) at or near that interaction point. Selecting an additional experience point (a still image) may access and present options associated with that digital experience point. For example, the still image may be displayed, along with ordering information to purchase particular items. Digitally printed goods, such as apparel, posters, mugs, or any object with a printable surface design, may be presented for purchase. On purchase, the specific still image may be sent for on-demand printing of the ordered product. Generating the digital experience object as a video of the digital model, with color morphing and viewpoint movement to capture thousands of view and color possibilities, and extracting thousands of digital frames as experience points accessible through the digital experience object, enables additional surface design purchases from the digital and physical object than previously possible.

Each digital experience point may link to further digital experience points. In the example embodiment discussed above, the initial digital experience point includes a video, and leads to thousands of further digital experience points with individual still images. Alternatively, the initial digital experience may include a 2D or 3D image of the digital model, and provide access to further digital experience points which are videos. The videos may differ in color morphing, or audio track, allowing user selection of a particular desired experiences, and each video in turn may provide access to thousands of further digital experience points (each with a still image of the video). An access right software module may further control which digital experience points are accessible to any specific user (or group of users), and what is accessible within each digital experience point. For example, an owner of the digital module may configure purchase limits of specific digital experience points (still images). Once an owner determined purchase limit is reached, that digital experience point may no longer be presented to further users. Alternatively, each digital experience point may be licensed exclusively to individual users, such that once licensed no other users may access that digital experience point. The access rights may also control who can add digital experience points into the experience. For example, the owner may configure that any user can add digital experience points (digital content) to any specific experience point, and this added content may be public (accessible for all) or private (accessible only to the user). The private option may be a way for users to record audio (such as their personal commentary) or a photo (such as a "selfie" in front of the physical object) and have that audio, photo, or other digital content stored and accessible through a digital experience point any time that users access the digital experience.

Referring to FIG. 1, a block diagram illustrates the initial development of a digital model and digital environment, controlled parametrically through a computer-generated program by the user or asset creator 100, to create a unique and customizable design for digital asset generation. Creation and validation of digital assets 102 and artworks for manufacturing are delivered to the end-user(s) and/or owner(s) 104. Feedback loops for production validation and information sharing between the owner(s) and asset creator ensure all needs are met. The output is used for licensing and production of branded assets in both physical and digital manifestations by the owner(s).

Figure 2:
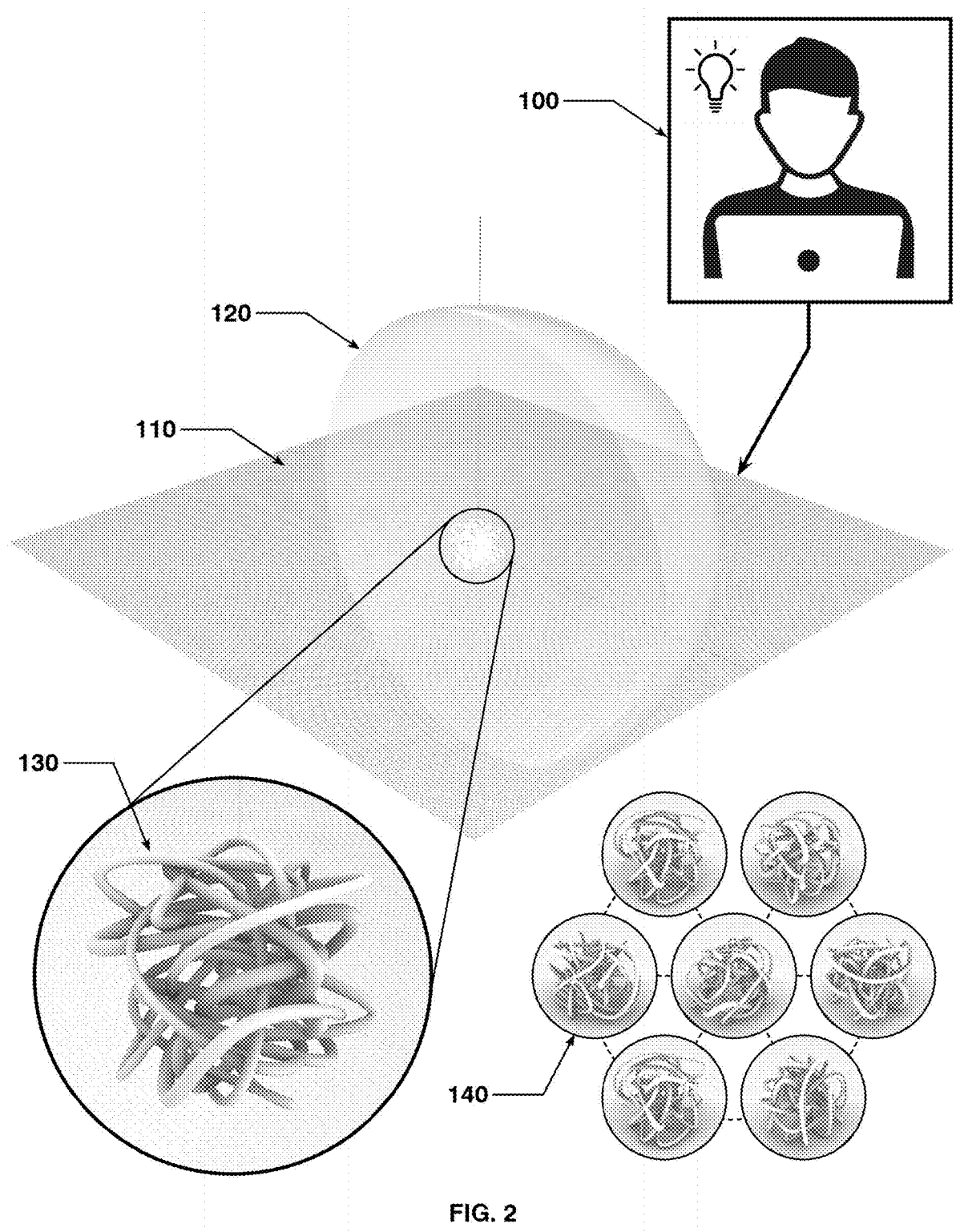
FIG. 2 is a three-dimensional view, as an example, of the creation of a digital model with a unique geometric configuration based on its input parameters and within a digital environment.

Referring also to FIG. 2, a user or asset creator 100 may work in a virtual object generator 110 to mathematically and parametrically develop the digital environment 120 and the unique digital model 130. Visually similar, but also unique, geometric organizations 140 are shown to further clarify what can yield from the variable controlled digital model. The illustrated digital model and digital environment is one example, and may be replaced with alternative digital models and digital environments.

Figure 3:
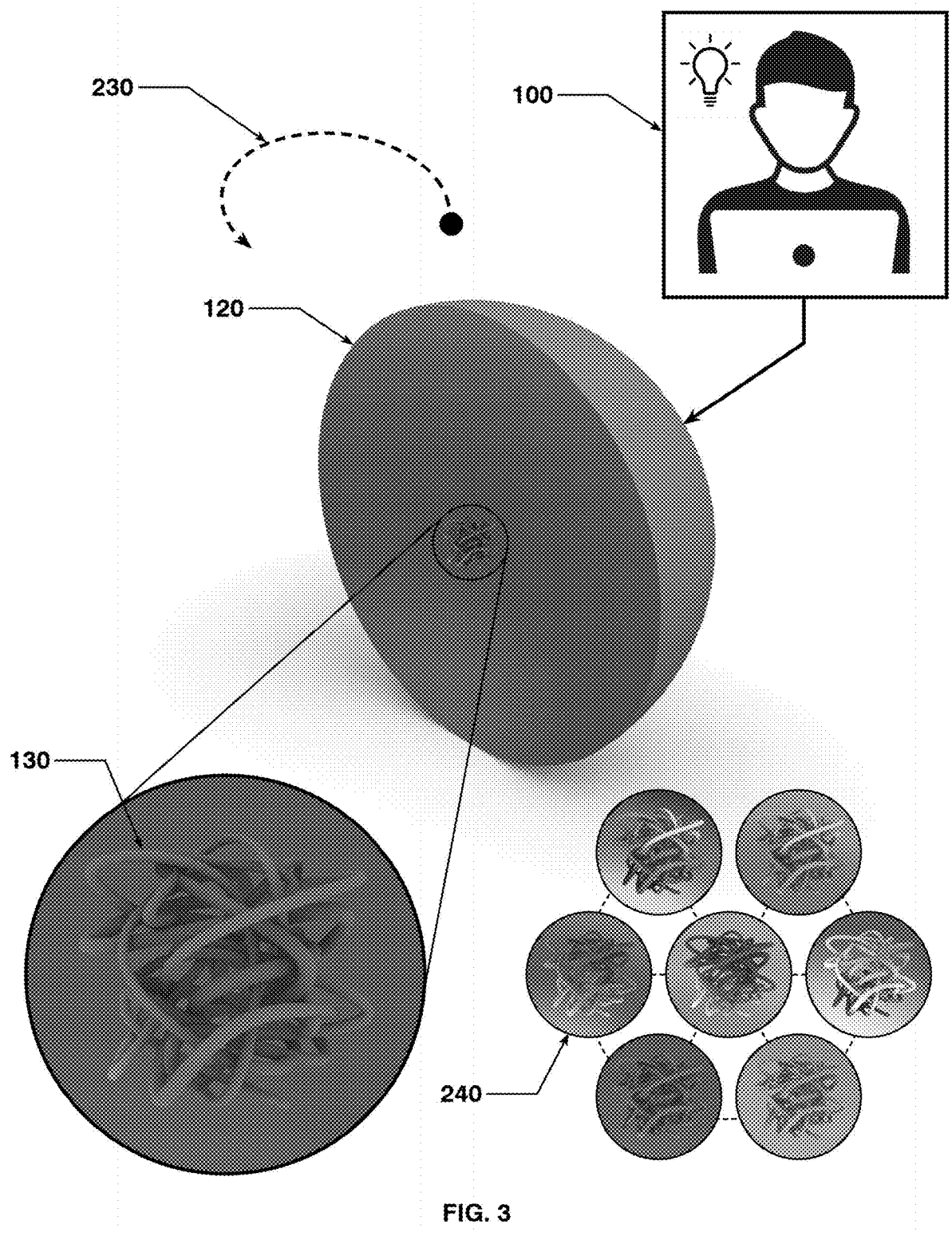
FIG. 3 is a three-dimensional view, as an example, of the digital model in a digital environment where endless colorways can be applied to generate countless licensable, digital artworks and assets.

Referring also to FIG. 3, a user or asset creator 100 may apply a customizable, parametrically controlled, and unique colorway to the digital environment 120 and another colorway to the digital model 130. A spatial location point 230 may be moved in the digital environment to further modify the coloration of the digital model and digital environment. A visual composition of the digital model is shown with other examples 240 of colorways applied to both the digital environment and digital model to further clarify the attribution of color in the virtual object generator.

Figure 4:
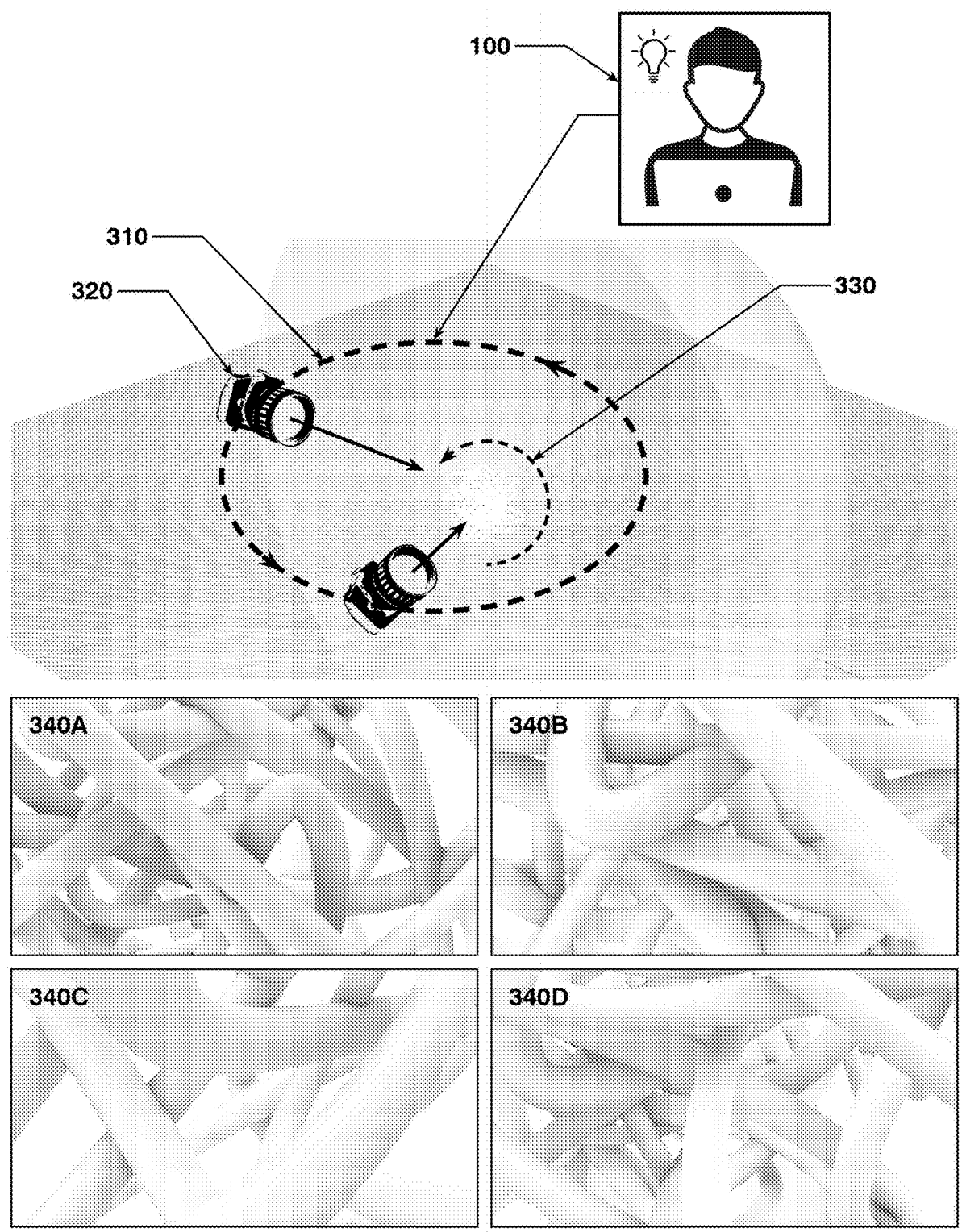
FIG. 4 is a three-dimensional view, as an example, of a unique digital model in a customized digital environment that can be visually manipulated based on vantage points, spatial relationships, and geometric translations and transformations.

Referring also to FIG. 4, a user or asset creator 100 may position a series of parametrically controlled image capture loops 310, viewpoints for composing the image capture 320, and mathematical transformations 330 of the digital model in its digital environment. A sampling of the composed digital model in its digital environment 340A-D illustrates the endless image capture of the digital model, digital environment, and applied colorways.

Figure 5:
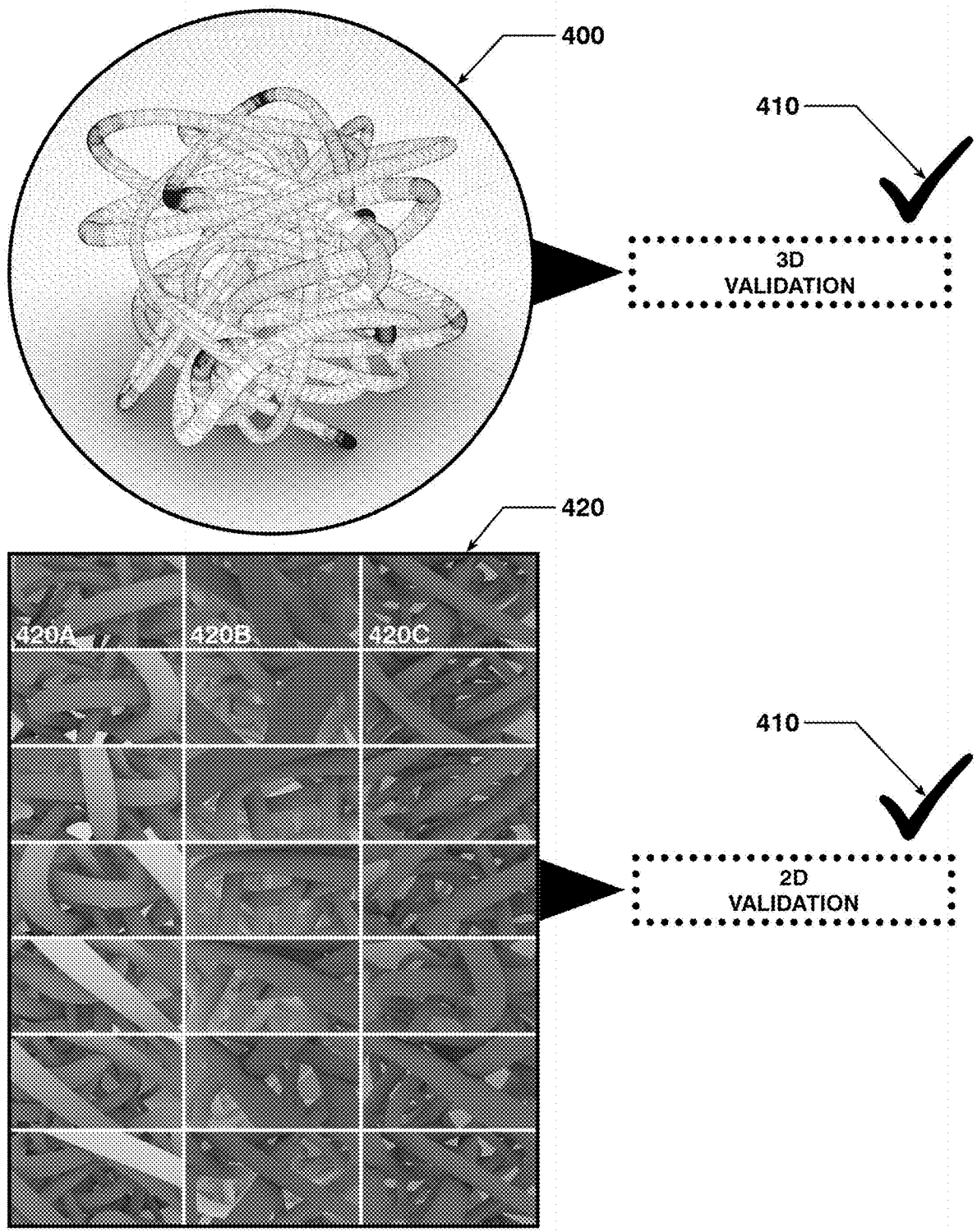
FIG. 5 is a three-dimensional view and a series of two-dimensional views and colorways, as an example, of the digital assets being extracted, validated, and manipulated further for specific digital and physical manufacturing applications for the end-user(s) and/or owner(s).

Referring also to FIG. 5, the digital model may be stored in a manufacturing file format and/or low level of detail file format 400 and processed through validation methods and checks 410 needed to prepare the digital model for the end-user(s) or owner(s) production and application requirements. Similarly, but also pertaining to digital assets in the form of videos and still images in their applied colorways 420 are prepared for digital and/or physical production in a sequenced inventory 420A-C, etc. The still images, and their videography when stitched together as keyframes, may also be processed through validation and checks 410 needed to prepare the digital assets for the end-user(s) or owner(s) production and application requirements.

Figure 6:
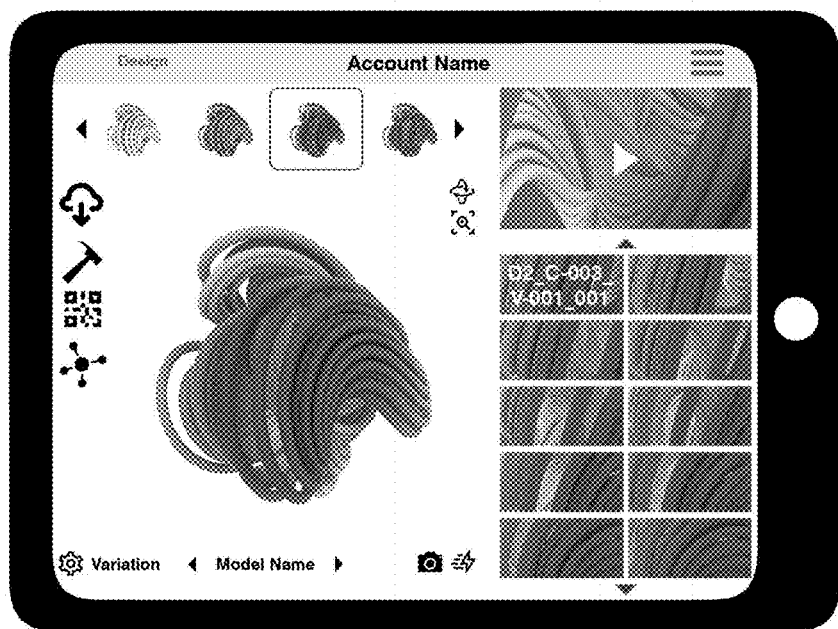
FIG. 6 is an illustration of a user interface for a digital experience object on multiple personal computing devices.
Figure 6:
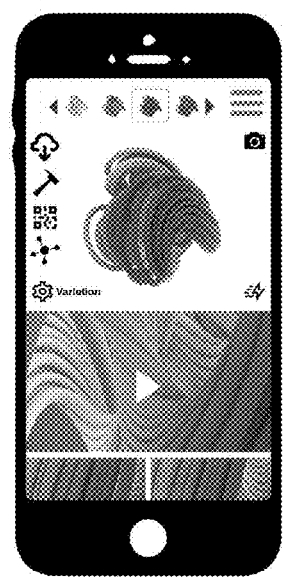
Figure 6:
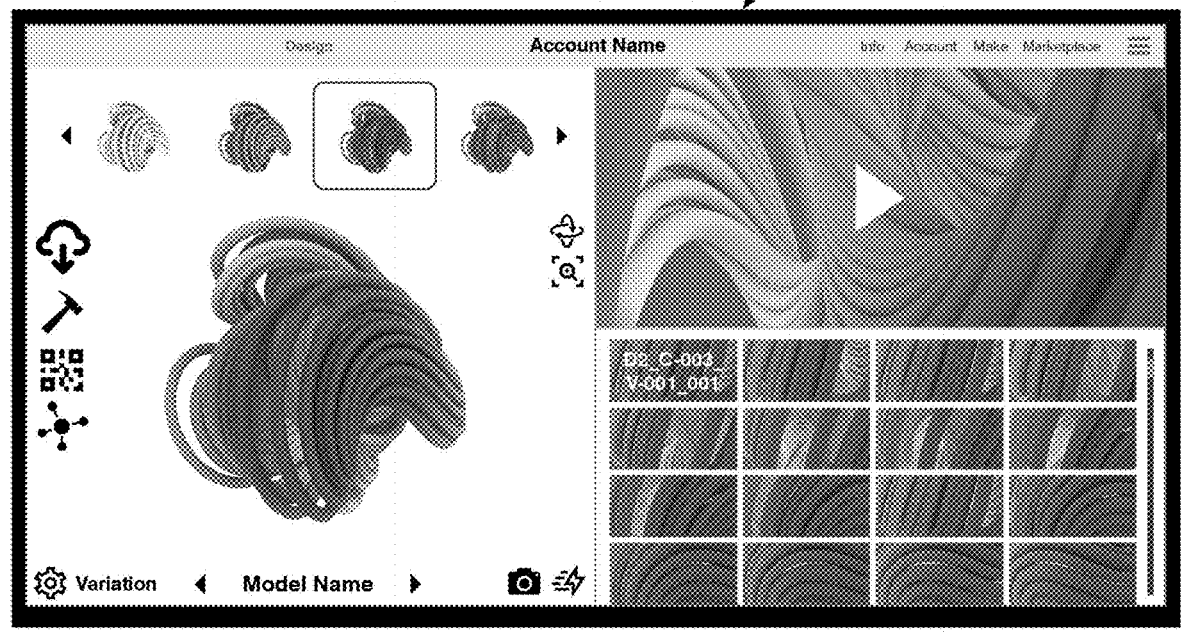

Via a QR code or similar as well as a website URL or similar, a consumer, end-user/owner, etc. may access and modify a digital model and its digital environment to create custom, unique digital assets for both physical and digital merchandise and experiences. Referring also to FIG. 6, through a user interface 500 for a digital experience object an end-user, owner, or consumer can engage with the 3d digital model, its digital environment, digital video, and digital still images. Capabilities include, but are not limited to, access to all digital 3d model files for manufacture and virtual/digital applications/experiences, the ability to order a physical object, a computer-generated code to identify/store/share the model, the ability to add custom content to the model, change the parameters/variation(s) of the model, navigate the model in its 3d environment, capture imagery, record video, store all digital assets created, and reach other digital experience objects and points.

Figure 7A:
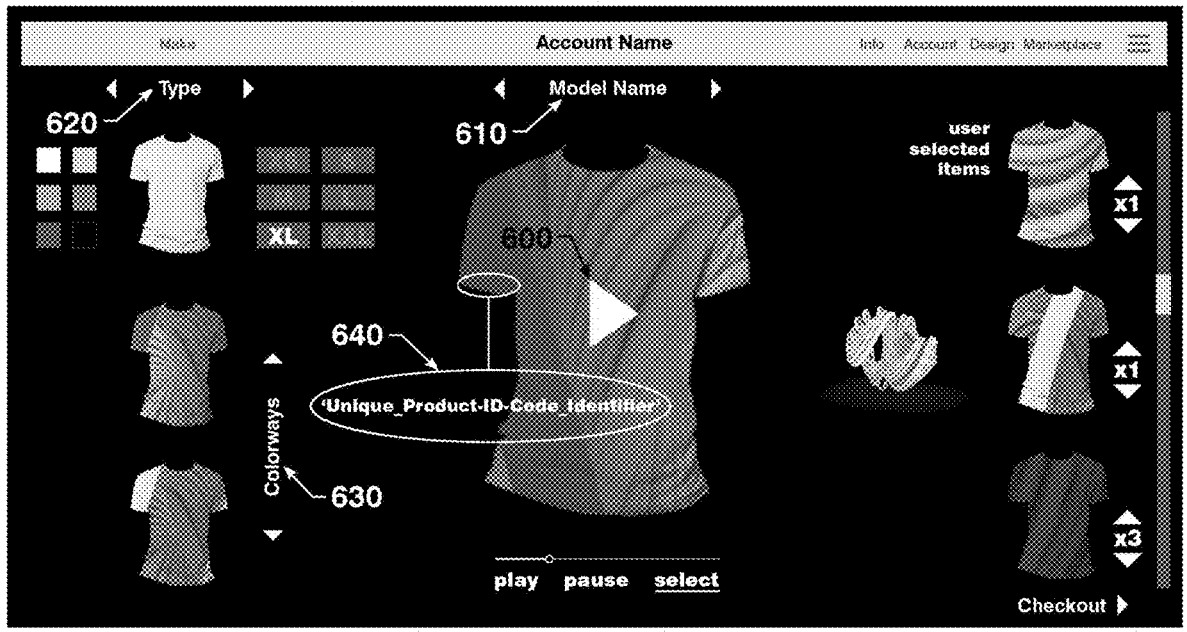
FIGS. 7A & 7B are illustrations of a user interface for digital experience object for a user to create merchandise designs from unique digital video assets, select a series of designs, and place on-demand print orders for custom merchandise.
Figure 7B:
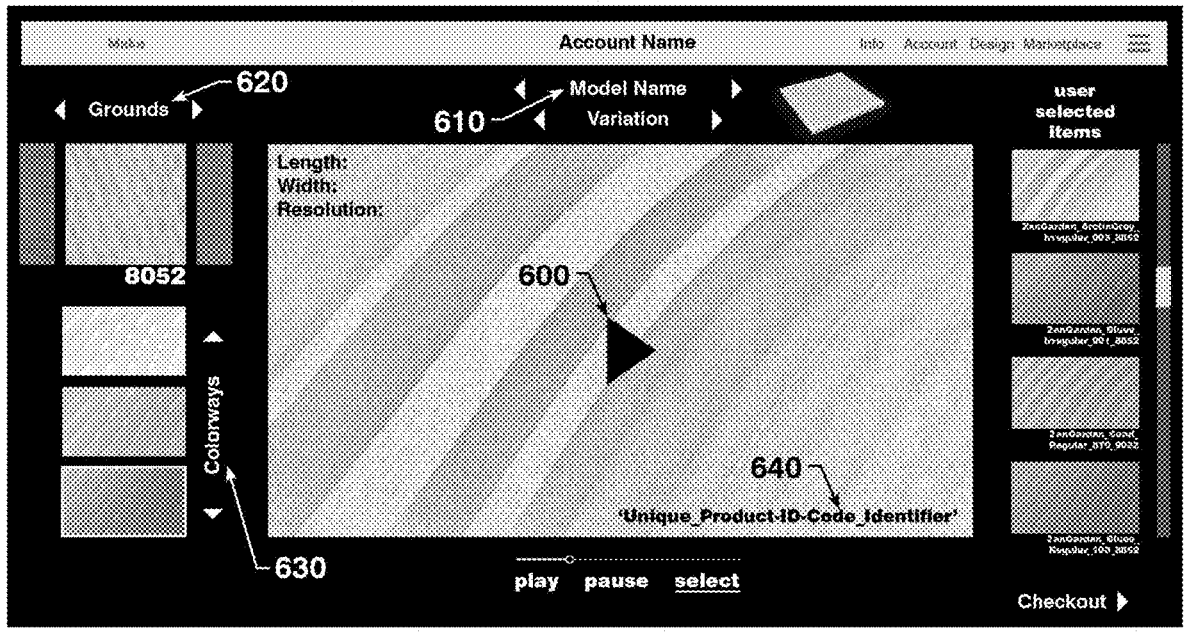

A consumer, end-user/owner, etc. can select any single video frame as a design and create a custom product order from the digital assets. Referring also to FIGS. 7A & 7B, an end-user, owner, or consumer can utilize a unique video 600 created from the 3d model and its digital environment. Capabilities include, but are not limited to, switching between digital 3d models 610, physical products 620, unique colorways 630, variations/parameters of the digital model, and digital videos in order to play, pause, and select a unique still image that is validated for a physical application in merchandising. Once selected, an end-user/owner or consumer can view the item selected in a list, specify a quantity, view a unique product identification code/id 640, and add the unique digital designs to their complete inventory or marketplace as well as purchase physical products and merchandise. One example, clothing design, is illustrated in FIG. 7A, with another example, large-scale surface design, illustrated in FIG. 7B, and similar interfaces and methods may be applied to any use case for on-demand digital printing.

Figure 8:
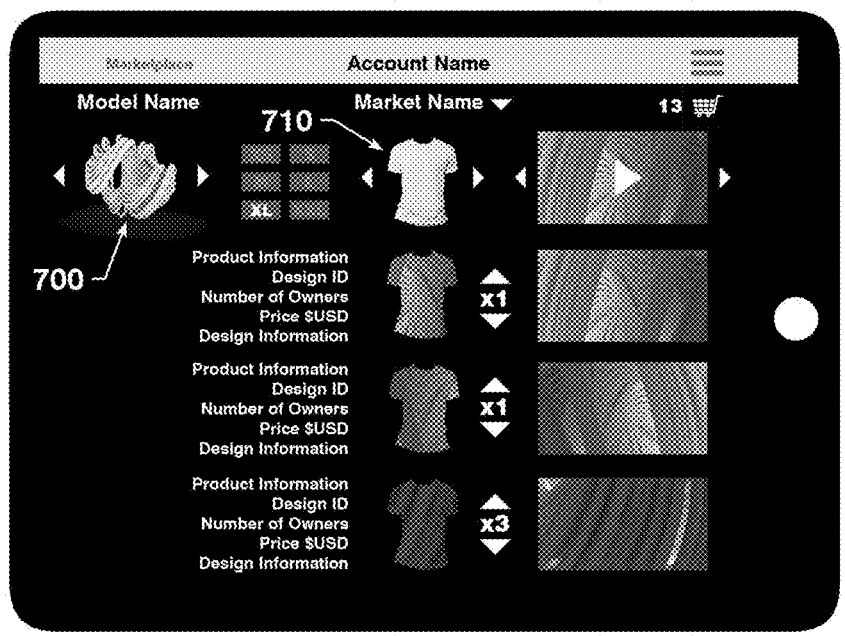
FIG. 8 is an illustration of a digital experience object on multiple personal computing devices where a consumer, end-user/owner, etc. can access a marketplace of unique digital assets and designs for sale, trade, license, etc.
Figure 8:
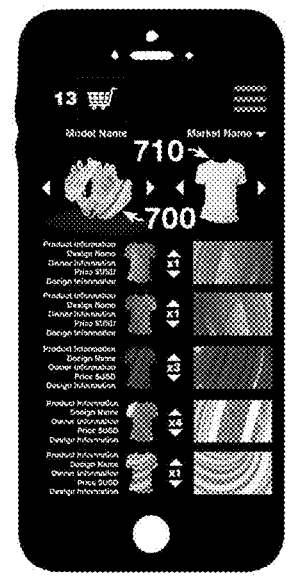
Figure 8:
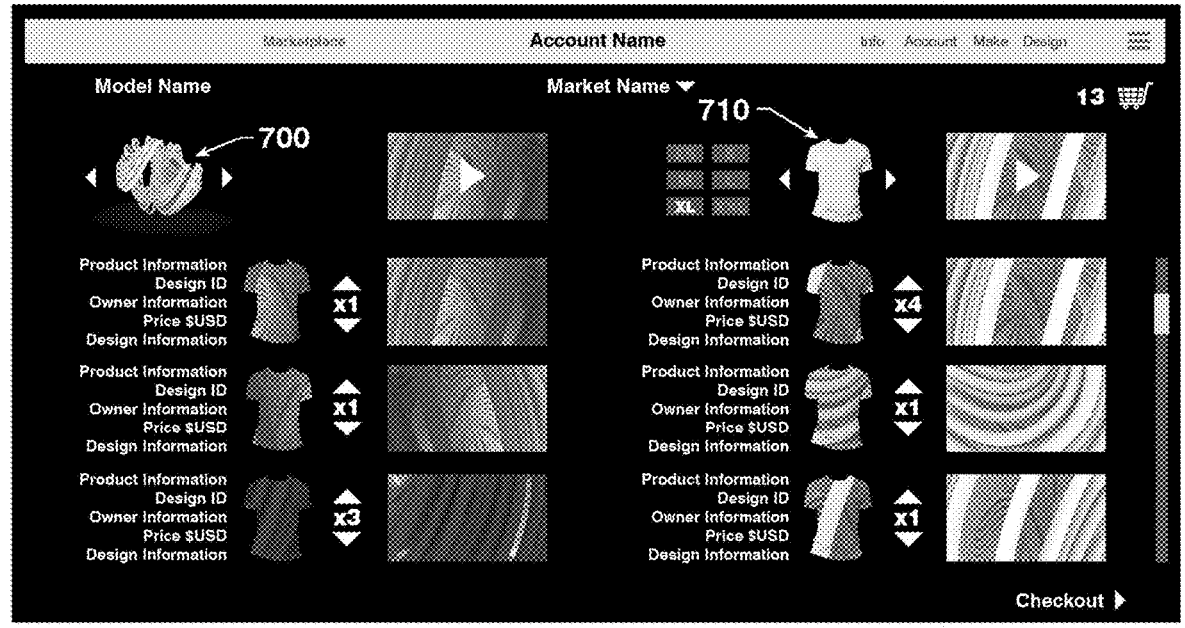

A user can decide to participate in the marketplace or keep their assets private, while allowing for digital transactions to occur for a full digital model asset collection or an individual digital asset such as a still image. All are unique digital assets derived from the digital model and are digitally transferable. Referring also to FIG. 8, an end-user, owner, or consumer can publicly share their owned or co-owned unique digital assets in the form of 3D models 700 for digital and physical application, unique designs 710 of products and merchandise, videos, still images, etc. and specifies the status and availability of each digital or physical assets to the marketplace community. One example is a marketplace that has digital and physical assets available for digital transaction in both physical and digital means of delivery. Other information could be, but is not limited to, product information, design name, ownership information, unit price, design information, sizes, file formats, unique description, other values/metrics, etc.

Figure 9:
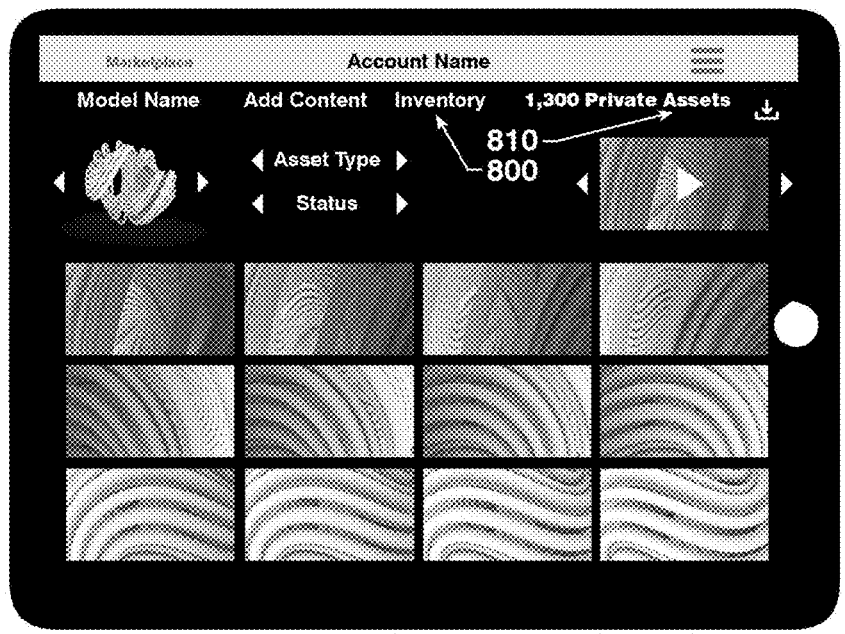
FIG. 9 is an illustration of a digital experience object on multiple personal computing devices where an end-user/owner can access their complete digital inventory of unique digital assets that they own or co-own with other end-user/owners.
Figure 9:
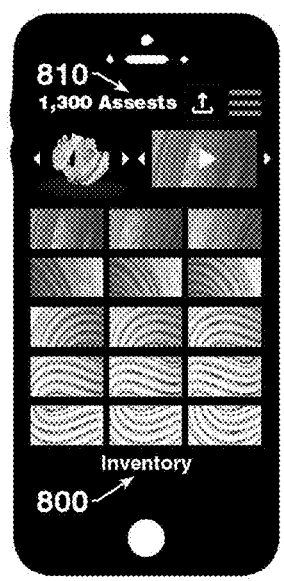
Figure 9:
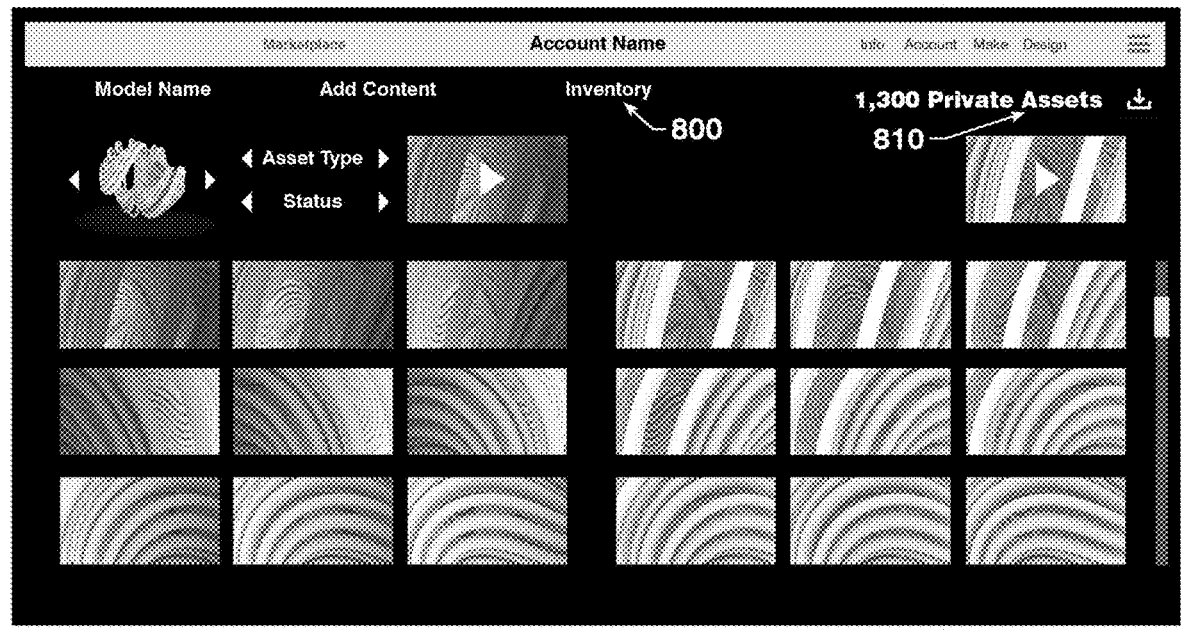

Referring also to FIG. 9, an end-user, owner, or consumer can access their unique inventory 800 of digital assets 810 for both physical and digital applications. Capabilities shown, include but are not limited to, viewing, downloading, specifying status (e.g., private, public, for sale, for license, etc.), uploading additional content, minting, etc., of all digital inventory assets. Users may also add these to a marketplace or download a variety of file formats for other digital and physical applications. A user can quickly identify all digital assets in their complete inventory as well as the statuses to keep track of and organize all assets for private, public, or consumer driven digital and physical applications.

Figure 10:
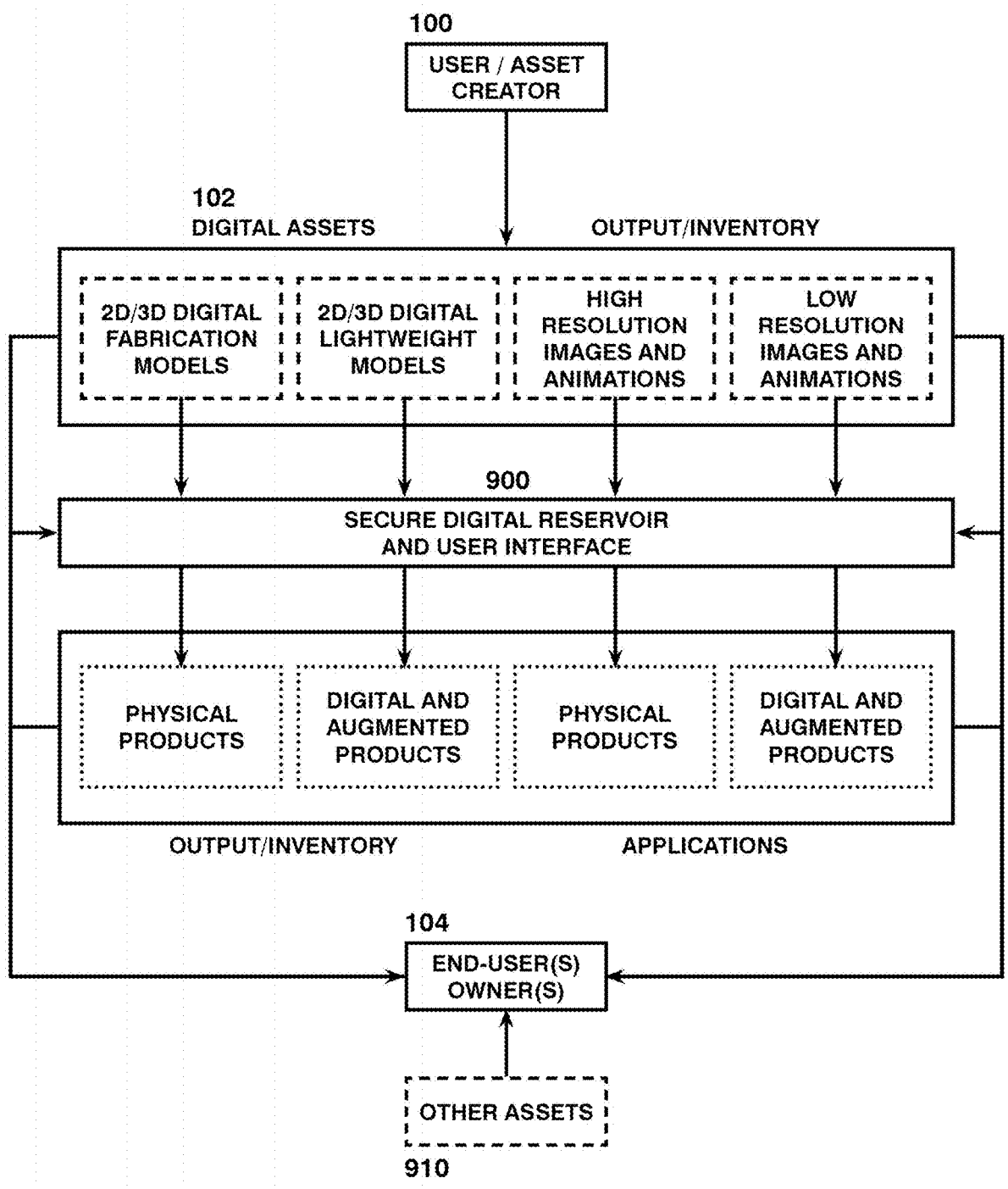
FIG. 10 is a block diagram further describing the digital assets, the secure digital reservoir/user interface/digital experience object for exploring and creating assets, the applications of the digital assets created, the end-users/owners receiving both digital assets and related applications, and other end-user/owner assets able to be uploaded and added to the digital reservoir.

Referring also to FIG. 10, end-user(s) or owner(s) 104 have access to the digital assets 102 created by a user/asset creator 100. Through a secure digital reservoir and web-based user interface 900, an user/asset creator and/or a end-user/owner can access digital assets, create new digital assets, deploy digital assets to a variety of digital developer and physical object manufacturers to produce experiences, goods, merchandise, etc. that is branded, marketable, licensable, and manufactured from the unique digital assets created from the methods and systems used to create the digital model and its digital environment. The end-user/owner may also take other assets 910, upload them to the secure digital reservoir and user interface to further create unique experiences as part of the collection of assets.

Figure 11:
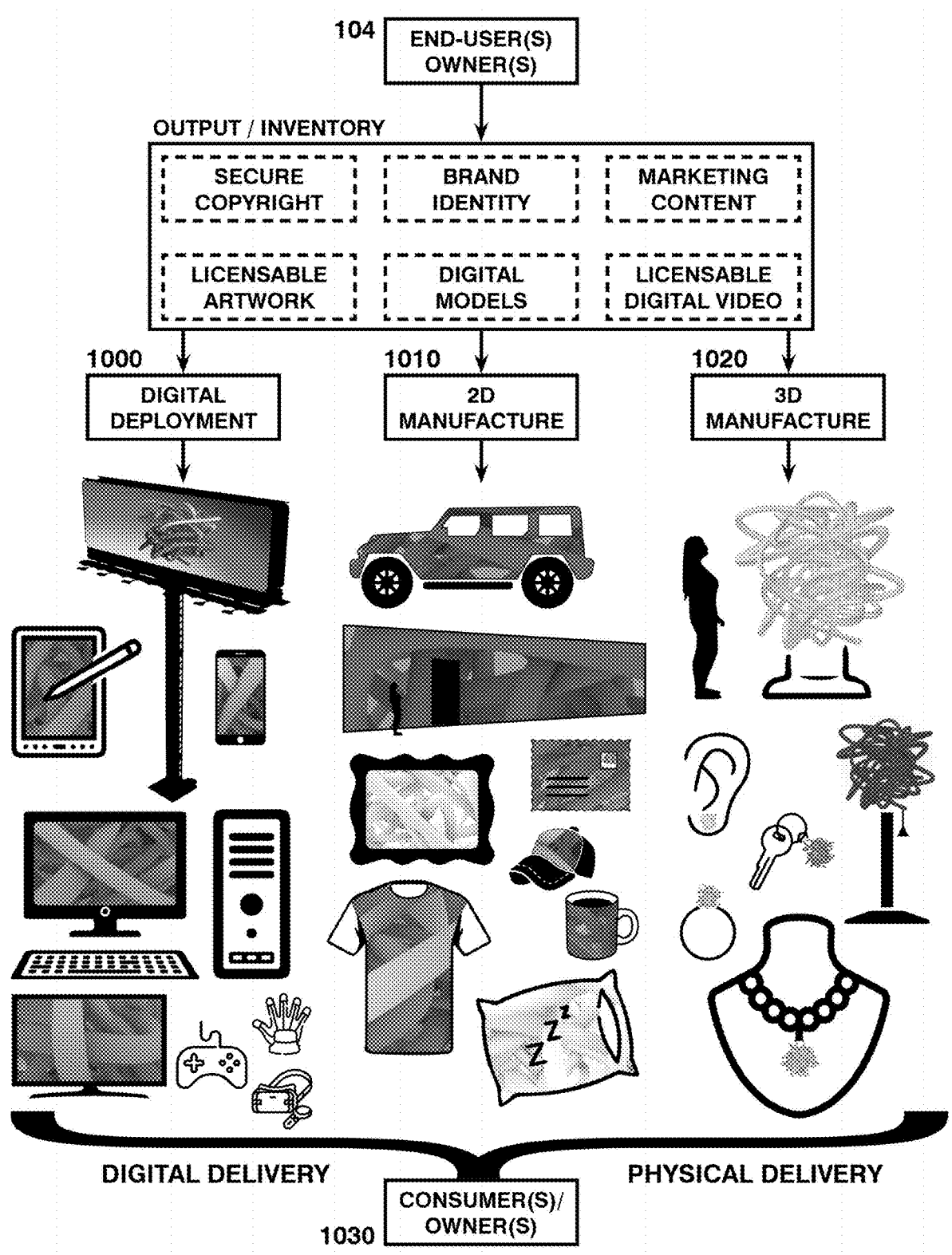
FIG. 11 is a block diagram and a series of views showing examples of the physical and digital objects and experiences created from the unique digital assets as they are applied for organizational or personal branded products and/or merchandise.

Referring also to FIG. 11, end-user(s) or owner(s) 104 may deploy digital assets to a variety of digital developer and physical object manufacturers to produce output such as, but not limited to, experiences, goods, merchandise, etc. that is branded, marketable, licensable, and manufactured from the unique digital assets created from the methods and systems used to create the digital model and its digital environment. Possible examples of the digital experiences and physical items that can be produced in a variety of use cases for the consumer(s) or owner(s) include image, video, and other assets for digital deployment 1000, printed matter for 2D manufacture 1010, or machine produced items for 3D manufacture 1020. Deployed or manufactured items may be utilized by the end-user/owner, or provided or sold to other consumer(s) 1030.

Figure 12:
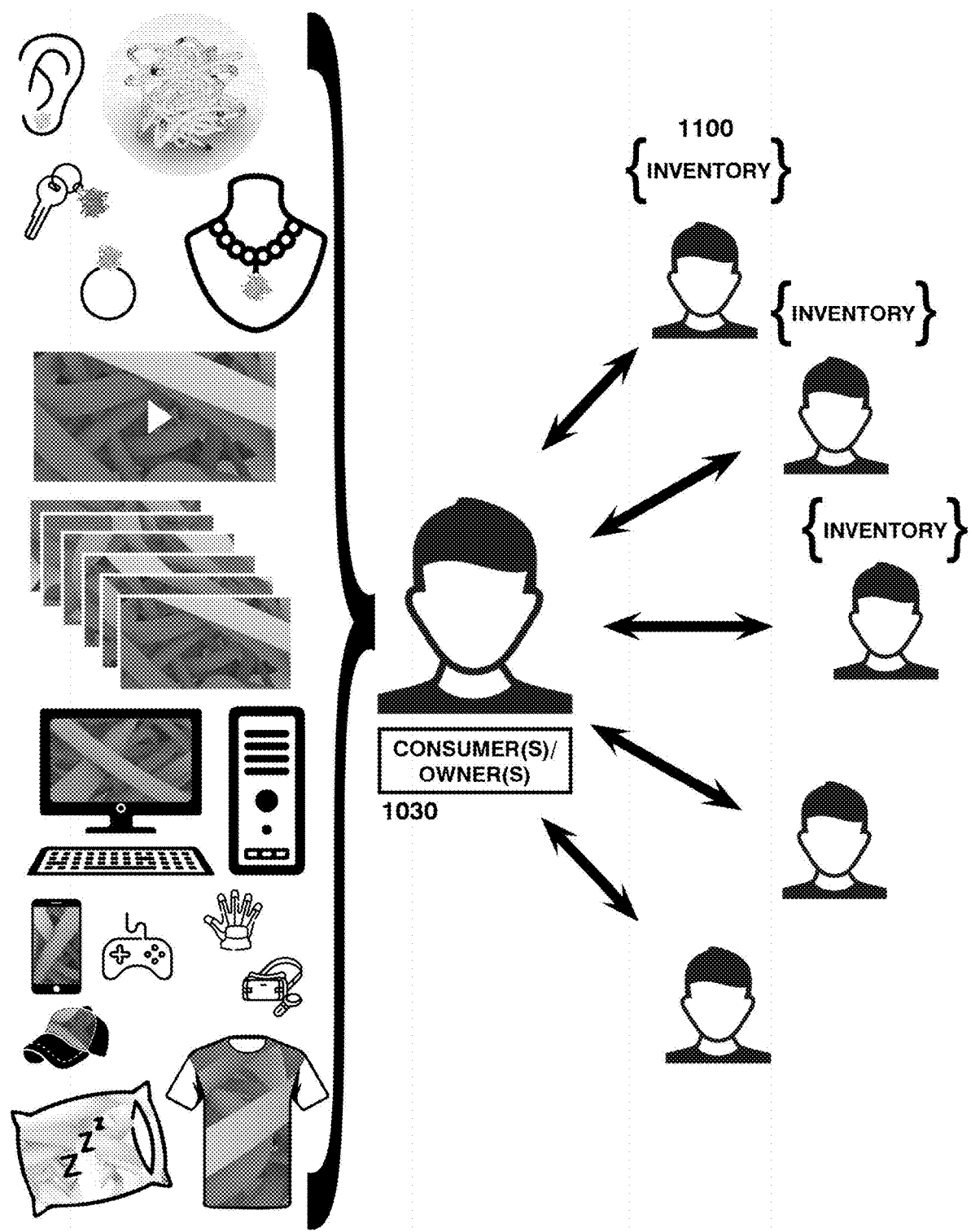
FIG. 12 is an illustration of an end-user/owner with their inventory of digital and physical assets derived from the digital model and its digital environment.

The produced assets are able to be deployed in a number of digital and physical applications or transactions with a community of consumers, end-users/owners, etc. Referring also to FIG. 12, the consumer(s) or owner(s) 1030 may have a collection of unique, digital and physical assets created and developed from the unique 3d model in its unique 3d environment utilizing the digital experience objects and digital touchpoints. A consumer or owner has the ability to digitally and physically deploy all inventory 1100 of assets for personal use in a variety of applications and/or to other consumer(s) or owner(s) in the form of digital or physical assets and merchandise. Alternatively, a consumer or owner can keep their inventory private and not make it available for a community of consumers, end-users, owners, etc.

Example Implementation

In one example embodiment, an asset creator may operate the computer-aided design (CAD) software application Rhinoceros 3D, and its integral visual programming language and environment, Grasshopper. Using parametric software components, the asset creator may develop a hyper-customizable geometric digital model that is made up of closed, solid polysurfaces and/or closed meshes. The asset creator may then use geometric analysis components to verify scale, geometric feature sizes, and other geometric instances are within current guidelines of manufacturing technology (e.g., additive manufacturing, subtractive manufacturing, machining, molding, casting, bending, braking, forming, etc.). Geometric analysis to consider includes, but is not limited to, minimum and maximum manufacturing working area, wall thickness, wires, feature size, bridge, emboss, deboss, engraving, escape holes, sprues, pockets, accuracy, tolerance, clearances, draft angle, fillet, fatigue, etc. Using parametric software components, the asset creator may develop a separate, hyper-customizable geometric environment that is made up of points, curves, surfaces, polysurfaces, and/or meshes. The environment may be utilized as a 3D visual 'background' for the geometric digital model, to encompass and/or envelop the geometric digital model, etc. Using the three-dimensional navigation tools parametrically (e.g., pan, zoom, orbit, etc.), the asset creator may repeatedly navigate around the digital model and digital environment to vantage points of interest (e.g., perspective, top, bottom, side, axonometric, isometric, or another viewpoint). Virtual display settings may be adjusted for further likeness. Once satisfied, desired vantage points may be saved with specific names (e.g., 'Unique-ID_Model-ID_Viewpoint-ID_Colorway-ID_00001'). The asset creator may use parametric modeling components to develop a palette of colors and/or material textures that can be applied to either the geometric digital model or geometric environment (e.g., solid color swatches, gradients, hombres, bump maps, texture maps, translucent colors, etc.). Next, the asset creator may set up geometric relationships and/or geometric translations and transformations between the geometric digital model, digital environment, and associated color palette of colors/materials (e.g., translation vector movements, rotations, distances, adjacencies, heights, lengths, widths, areas, volumes, etc.).

With the vantage points and geometric relationships, translations, and transformations configured, the asset creator generates and exports anywhere from one to thousands (or more) of still images which are sequentially extracted from the geometric digital model and combined to create a video display of the geometric digital model. The generation and export may be done using parametric software components, 3D animation tools/plugins, or other image capture methods within the CAD applications' digital environment (e.g., animated sliders to control parametric components, paths, loops, focal points, etc.). The exported image file type and/or resolution may be selected or adjusted to adhere to design guidelines for digital display and/or digital printing technology available in the current market (e.g., .jpeg, .png, .gif, .pdf, .tiff, .bmp, .etc. files for display or printing on personal devices, personal computers, digital display screens, stamps, postcards, stationary, posters, billboards, textiles, substrates, etc.). The exported files may be stored within a folder, series of folders, other file system structure, or within a database, preferably using a sequential naming convention (e.g., 'Model_Variation_001_Color_001', 'Model_Variation_002_Color_001', etc.).

In addition to export of still images, the geometric digital model and associated parametric transformations may be used to modify and/or cycle through the variations of the geometric digital model and, at the same time, export the resulting geometric digital model variations to a file format that is appropriate for digital applications/experiences and manufacturing (e.g., .stl, .3mf, .obj, .dwg, .dxf, .amf, .xml, .vrml, .glb, .gltf, three.js, webGL, .json, .smf, etc.). The exported manufacturing files may be sequentially named or otherwise associated with related still image export files (e.g., 'Unique-ID_Model-ID_Viewpoint-ID_Colorway-ID_00001', 'Unique-ID_Model-ID_Viewpoint-ID_Colorway-ID_00002', etc.), and stored in a related storage location.

The exported digital image files may be imported sequentially into video editing software (e.g., Adobe Premier, CyberLink PowerDirector, Pinnacle Studio, Final Cut Pro, etc.) to organize, compose, and/or transition through the individual images and create a video file format that is appropriate for digital displays (e.g., .avi, .mpeg, .mov, .wmv, .swf, .mod, etc.). The digital video may be uploaded to an internet-based location such as Uniform Resource Locator (URL), a.k.a. website, developed in a web programming language (e.g., JavaScript, Java, HTML, CSS, etc.), or web-based database, along with the still image files and/or the digital design model manufacturing and digital application/experience files. Available access codes such as matrix barcodes, machine-readable optical labels, other security coded keys/passwords (e.g, QR code, image recognition, serial number, blockchain, near field communication (NFC), Microsoft Tag, Maxicode, Aztec code, etc.), or a direct URL may be utilized to provide one or more digital access links to the digital video URL.

The matrix barcodes or other security coded keys/passwords may be distributed to end-users, owners, and/or consumers to interact with the digital videos, digital still images, and geometric digital models. As one example, where others are mentioned throughout, the interface allows the user to navigate the digital video, stopping or pausing on a specific video frame, clicking a frame to select it, and positioning for purchase a variety of digital and physical consumer goods related to the desired variation selected by the consumer. A digital order may be placed by the user/consumer for direct delivery of digital files and/or direct to manufacture physical consumer goods, produced using the digital files, as available or desired.

OTHER EMBODIMENTS

There are many embodiments and variations that will be apparent to persons skilled in the art. While the preferred embodiment of the invention operates within design, fine arts, and licensing worlds, the systems and methods can be applied to related areas. Other embodiments, such as, any narrative articulated in visual terms for branding, marketing, production, manufacture, licensing of pattern design, exclusivity rights, etc., as digital assets, can be bought, sold, and shared, including but not limited to, non-fungible tokens, digital avatars, digital gaming environments, augmented reality or virtual reality applications, digital experiences, projection mapping, holographic displays, digital licensing markets, GPS positioning, mobile and/or personal device interoperability/interconnectivity, and CNC positioning. Unique digital models and environments that are produced from the digital assets created from the initial development of the digital model and digital environment can further utilize the methods and systems for additional, unique digital assets. Furthermore, the ability of the end-user(s) or owner(s) to add and archive additional content in the form of videography, imagery, or other formats provides depth of personal experience and creates additional value. This provides the opportunity to explore the space between the digital and physical worlds, identifying that space as the primary subject for the creation of new digital artworks and assets.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

The invention claimed is:

1. A method for creating and interacting with an interconnected physical and digital experience, comprising:
    creating a video of a 3D digital model by:
        designing the 3D digital model and a surrounding digital environment of the physical object and verifying that the design is producible with current manufacturing technology;
        manipulating the 3D digital model within the digital environment and identifying multiple vantage points of interest;
        developing a palette of colors and/or material textures that apply to the 3D digital model and the digital environment;
        configuring a set of geometric relationships, translations, and transformations applicable to the 3D digital model, palette of color and/or material textures; and
        capturing thousands or more of sequential image files by moving between the identified vantage points of interest while applying the configured set of geometric relation, translations, and transformations, and creating the video from the sequential image files;
    manufacturing a physical object based on the 3D digital model;
    creating a first digital experience point including the video and one or more links to further digital experience points;
    creating multiple further digital experience points wherein each further digital experience point includes one of the thousands or more image files and links to zero or more further digital experience points;
    deploying a digital experience object at a network accessible location wherein the digital experience object includes the first digital experience point and each further digital experience point reachable by following links originating from the first digital experience object;
    providing at least one access code to the digital experience object with the manufactured physical object, wherein each access code is a QR code or an URL;
    associating owner configurable license rights with each digital experience point, wherein access rights of a specific digital experience point are configurable between public access, limited access to one or more specific users, or limited to a specific number of users;
    uploading additional digital content to one of the further digital experience points;
    creating a new further experience point linked to one of the further digital experience points, and uploading additional digital content to the new further experience point; and
    manufacturing a consumer product with a physical design applying the image file of one of the further digital experience points.

2. A method for creating and interacting with an interconnected physical and digital experience, comprising:
    creating a video of a 3D digital model;
    manufacturing a physical object based on the 3D digital model;
    creating thousands or more image files from individual frames of the video;
    creating a first digital experience point including the video and one or more links to further digital experience points;
    deploying a digital experience object at a network accessible location wherein the digital experience object includes the first digital experience point and each further digital experience point reachable by following links originating from the first digital experience object; and
    providing at least one access code to the digital experience object with the manufactured physical object.

3. The method of claim 2, wherein creating a video further comprises:
    designing the 3D digital model and a surrounding digital environment of the physical object and verifying that the design is producible with current manufacturing technology;
    manipulating the 3D digital model within the digital environment and identifying multiple vantage points of interest;
    developing a palette of colors and/or material textures that apply to the 3D digital model and the digital environment;
    configuring a set of geometric relationships, translations, and transformations applicable to the 3D model and digital environment, palette of color and/or material textures; and
    capturing the video by moving between the identified vantage points of interest and capturing each keyframe of the video as an image while applying the configured set of geometric relation, translations, and transformations.

4. The method of claim 2, wherein distributing at least one access code further comprises distributing a QR code or an URL.

5. The method of claim 2, further comprising creating multiple further digital experience points, wherein each further digital experience point includes one of the thousands or more image files and links to zero or more further digital experience points.

6. The method of claim 5, further comprising associating owner configurable license rights with each digital experience point.

7. The method of claim 6, further comprising configuring access rights within the configurable license rights, wherein access rights of a specific digital experience point are configurable between public access, limited access to one or more specific users, or limited to a specific number of users.

8. The method of claim 7, further comprising uploading additional digital content to the specific digital experience point.

9. The method of claim 7, further comprising creating a new further experience point linked to from the specific digital experience point, and uploading additional digital content to the new further experience point.

10. The method of claim 7, further comprising manufacturing a consumer product with a physical design applying the image file of the specific digital experience point.

11. An interconnected physical and digital experience system, comprising:
    a physical object created from a 3D digital model;
    thousands or more image files of the 3D digital model;
    a video of the 3D digital model sequentially progressing through the image files;

a first digital experience point including the video and links to one or more further digital experience points;

a digital experience object including the first digital experience point and each further digital experience point reachable by following links originating from the first digital experience object; and at least one access code to the digital experience object.

12. The system of claim 11, wherein the video further comprises a progression of geometric relationships, translations, and transformations applied to the 3D model or a surrounding digital environment and/or a palette of color and/or material textures while moving through multiple vantage points of interest.

13. The system of claim 11, wherein at least one access code is a QR code or an URL.

14. The system of claim 11, further comprising thousands or more further digital experience points such that each of the thousands or more further digital experience points includes one of the image files of individual frames of the video and links to zero or more of the thousands or more further digital experience points, and wherein at least one of the thousands or more further digital experience points is linked to by the first digital experience point.

15. The system of claim 14, further comprising one or more owner configurable license rights associated with each digital experience point.

16. The system of claim 15, further comprising one or more access rights within each of the configurable license rights, wherein access rights of a specific digital experience point are configured to public access, limited access to one or more specific users, or limited access to a specific number of users.

17. The system of claim 16, further comprising additional digital content uploaded to the specific digital experience point.

18. The system of claim 16, further comprising a new further experience point linked to from the specific digital experience point, the new further experience point having uploaded additional digital content.

19. The system of claim 16, further comprising a consumer product manufactured with a physical design applying the image file of the specific digital experience point.

\* \* \* \* \*